US012768590B2

(12) United States Patent
Humble et al.

(10) Patent No.: US 12,768,590 B2
(45) Date of Patent: Oct. 20, 2026

(54) MICROCHANNEL DISTILLATION DEVICE FABRICATED USING ADDITIVE MANUFACTURE

(71) Applicant: Battelle Memorial Institute, Richland, WA (US)

(72) Inventors: Paul H. Humble, Richland, WA (US); Dan R. Bottenus, Richland, WA (US); Timothy G. Veldman, Kennewick, WA (US); Mike D. Ripplinger, Richland, WA (US); Warren W. Harper, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 367 days.

(21) Appl. No.: 18/346,233

(22) Filed: Jul. 1, 2023

(65) Prior Publication Data

US 2025/0003678 A1 Jan. 2, 2025

(51) Int. Cl.

| | |
|---|---|
| ***F25J 3/04*** | (2006.01) |
| ***B01D 3/32*** | (2006.01) |
| ***B33Y 80/00*** | (2015.01) |

(52) U.S. Cl.

CPC ................ *F25J 3/044* (2013.01); *B01D 3/32* (2013.01); *B33Y 80/00* (2014.12); *F25J 2290/20* (2013.01)

(58) Field of Classification Search

CPC .......... F25J 3/044; F25J 2290/20; B01D 3/32; B01D 3/10; B33Y 80/00

See application file for complete search history.

(56) References Cited

U.S. PATENT DOCUMENTS

| | | | |
|---|---|---|---|
| 6,666,909 B1 | 12/2003 | Tegrotenhuis et al. | |
| 6,875,247 B2 | 4/2005 | Tegrotenhuis et al. | |
| 7,051,540 B2 | 5/2006 | Tegrotenhuis et al. | |
| 7,540,475 B2 | 6/2009 | Stenkamp et al. | |
| 2006/0016215 A1* | 1/2006 | Tonkovich | B01D 3/146 62/902 |
| 2013/0068220 A1* | 3/2013 | Kudaravalli | F25J 3/04981 128/201.21 |

OTHER PUBLICATIONS

Avasthi A, et al. "Kiloton-scale xenon detectors for neutrinoless double beta decay and other new physics searches", Phys Rev D. Dec. 20 (2021) 104 (11).

(Continued)

Primary Examiner — Renee Robinson

(74) *Attorney, Agent, or Firm* — Derek H. Maughan; Frank Rosenberg

(57) ABSTRACT

Unique distillation columns provide improved gas separation. The efficiency of air separation was tested using three different small scale cryogenic distillation columns. An inventive additively-manufactured column demonstrated superior performance as compared to a random packed column and a microchannel distillation (MCD) plate-type layered (PTL) column. These results demonstrate the feasibility of using additive manufacturing to construct MCD devices and pave a way for constructing novel MCD designs. The inventive design features a curved, open channel for vapor transport adjacent a wicking channel for liquid transport that can operate without a siphon under the influence of gravity. Operation in an insulated vessel enables separation of components from air.

15 Claims, 8 Drawing Sheets

(56) References Cited

OTHER PUBLICATIONS

Bowyer TW. "A Review of Global Radioxenon Background Research and Issues", Pure Appl Geophys. 178 (7) (2020) 2665-2675.
Hashim S. S., et al. "Oxygen separation from air using ceramic-based membrane technology for sustainable fuel production and power generation", Renewable and Sustainable Energy Reviews. 15(2) (2011) 1284-1293.
Hinchliffe, A. B. et al. "A Comparison of Membrane Separation and Distillation". Chemical Engineering Research and Design, 78(2)(2000) 255-268.
Hu, T. et al., "Nitrogen Production by Efficiently Removing Oxygen From Air Using a Perovskite Hollow-Fiber Membrane With Porous Catalytic Layer. Original Research", Frontiers in Chemistry, 6 (329) (2018).
Koros W.J. et al., "Pushing the limits on possibilities for large scale gas separation: which strategies? ", Journal of Membrane Science, 175(2) (2000) 181-196.
Yoshida S, et al., "Study of Zeolite Molecular Sieves for Production of Oxygen by Using Pressure Swing Adsorption", Adsorption. 5(1) (1999) 57-61.
Ziogas A, et al., "Development of a Microrectification Apparatus for Analytical and Preparative Applications", Chem Eng Technol, 35(1) (2012) 58-71.
MacInnes JM, et al., "Hydrodynamic characteristics of a rotating spiral fluid-phase contactor", Chem Eng Sci. 126 (2015) 427-439.
Lam KF, et al., "Review on gas-liquid separations in microchannel devices", Chem Eng Res Des. 91(10) (2013) 1941-1953.
Yang RJ, et al., A comprehensive review of micro-distillation methods. Chem Eng J. 313 (2017) 1509-1520.
Mardani S, et al. "Development of a unique modular distillation column using 3D printing", Chemical Engineering and Processing, 109 (2016) 136-148.
Neukäufer J, et al. "Methodology for the Development of Additively Manufactured Packings in Thermal Separation Technology", Chem Eng Technol. 42(9) (2019) 1-9.
Neukäufer J, et al. "Flexible distillation test rig on a laboratory scale for characterization of additively manufactured packings", Aiche Journal. (2021).
Bottenus D, et al. "Process intensification of distillation using a microwick technology to demonstrate separation of propane and propylene", Aiche Journal. 64 (2018) 3690-3699.
Tegrotenhuis W, et al. "Isotope Enrichment Using Microchannel Distillation Technology", Final Report Nov. 2018.
Huang XW, et al. "Hydrodesulfurization of JP-8 fuel and its microchannel distillate using steam reformate", Catal Today, 136(3-4) (2008) 291-300.
Sundberg A, et al. "Novel micro-distillation column for process development", Chem Eng Res Des. 87(5a) (2009) 705-710.
Yamanishi T, et al., "Preliminary Experimental-Study for Cryogenic Distillation Column with Small Inner Diameter, (II)", 2. J Nucl Sci Technol. 21(11) (1984) 853-861.

* cited by examiner

MICROCHANNEL DISTILLATION DEVICE FABRICATED USING ADDITIVE MANUFACTURE

GOVERNMENT RIGHTS

The work described here was funded by the National Nuclear Security Administration, defense Nuclear Nonproliferation Research and Development (NNSA DNN RD) and the US Department of Energy. The government has certain rights in the invention.

INTRODUCTION

Air separation refers to the process of separating air into its primary components. The motivation is usually to provide concentrated streams of oxygen, and nitrogen. In some cases, the recovery of argon and other noble gases is of interest. For example, there is an increasing interest in developing air separation processes to collect xenon from the atmosphere for large scale physics experiments.[1] Air separation processes are also a vital part of radioxenon monitoring systems used in the International Monitoring System for detecting nuclear explosions.[2] This work is motivated by the desire to develop small energy efficient air separation equipment that can be used to produce pure gasses from the atmosphere including oxygen, nitrogen, argon, and xenon.

A variety of processes are currently used for air separation, including cryogenic distillation, temperature and/or pressure swing adsorption, and membrane separation.[3-7] Adsorption and membrane-based processes are often used at smaller scales but are generally less energy efficient than large cryogenic distillation plants used for large scale production. Here we explore the miniaturization of cryogenic distillation to provide a small energy efficient air separation method that favorably competes with other small scale air separation processes and systems. Importantly, distillation is a versatile process that can be tuned for the collection and purification of various gas species present in air as well as other separations important to industry.

A traditional distillation column contains a series of horizontal trays spaced at regular intervals along the column. These trays provide regions for the liquid to pool and contact the vapor phase, with more-volatile components becoming concentrated in the vapor and less-volatile ones becoming concentrated in the liquid. Alternatively, the trays can be replaced with packing material of various shapes and sizes, with vapor-liquid contact occurring more regularly along the column, rather than only at trayed intervals.

A fundamental concept in distillation columns is the ideal stage. This is the separation that is achieved when a vapor and liquid are contacted and the components in these phases are allowed to partition and come to equilibrium. The trays in a trayed column allow for vapor liquid contact; however, imperfect mixing and mass transfer constraints may prevent full equilibrium from being reached on each tray. Thus, the separation achieved in a trayed distillation column is lower than that expected if each tray was an equilibrium stage. One measure of efficiency (n) in a trayed column is:

$$\eta = \frac{N_{stages}}{N_{trays}} \tag{1}$$

where $N_{stages}$ is the number of ideal stages required to achieve the measured separation, and $N_{trays}$ is the actual number of column trays.

In packed columns, the lack of physical trays requires a different metric for efficiency. A frequently used performance metric is the height equivalent of a theoretical plate (HETP), or the length of packing required to achieve the equivalent of one ideal stage. It is defined in terms of the height of the packing in the column (H) and $N_{stages}$ as shown in the equation below.

$$HETP = \frac{H}{N_{stages}}. \tag{2}$$

One means of reducing the HETP (i.e., increasing efficiency) is to increase the interfacial area between the liquid and vapor phases. Another method for reducing the HETP is to decrease the time required for molecules to diffuse and equilibrate between the liquid and vapor phases. Because diffusion in liquid is slower than gas phase diffusion, diffusion through the liquid can be the rate-limiting step that slows the approach to equilibrium. Liquid phase diffusion time can be minimized by maintaining well-dispersed high area liquid flow paths throughout the column that are as thin as possible. Packed columns are also used that distribute a downward flowing liquid through a packing with an upward flowing vapor, allowing intimate contact between the liquid and vapor phases. Distillation devices that seek to maintain liquid and vapor flow channels at widths below or around one millimeter have come to be known as "microchannel distillation" (MCD) devices.

MCD has already been applied to various systems to achieve low HETP values. For example, Ziogas et al[8] used traditional machining and stainless steel layering to achieve an HETP of 1.08 cm in the separation of iso-octane from n-octane. MacInnes et al[9] used centrifugal forces to achieve an HETP of 0.53 cm in the separation of 2,2-dimethylbutane from 2-methyl-2-butane. For a more comprehensive list, refer to various literature reviews.[10-11]

Additive manufacturing (AM, or 3D printing) is an enabling technology for new distillation column and packing designs. Features can be constructed down to the micrometer scale, and structures can be designed that allow for intimate contact between vapor and liquid phases. Some exploration of AM with distillation has already been performed. Mardani et al.[12] constructed a coil-shaped distillation column using AM and applied it to the separation of cyclohexane from n-hexane. Neukäufer et al.[13] began by designing various structured packings via AM, and then applied some of these[14] to achieve HETP values of 20-25 cm in the separation of cyclohexane and n-heptane. The column used had a height of 2.45 m and a diameter of 50 mm.

Pacific Northwest National Laboratory (PNNL) has previously demonstrated the ability to carry out effective separation in MCD devices using patented microwick technology.[15-18,19-24] This technology employs thin, porous wicks that are ~100 μm thick, and are alternately stacked between adjacent vapor channels. The liquid in these columns flows by surface tension forces (capillarity), rather than gravity. PNNL first demonstrated distillation with this technology to remove heavy sulfur species from JP8 jet fuel.[25] at temperatures above 200° C., with estimated HETP values of 1.8 cm.[26]

One challenge that has been observed with MCD has been the difficulty of maintaining low HETP values at low temperature. For example, Velocys, Inc.[27] applied MCD to the separation of hexane from cyclohexane at temperatures around 70° C. and achieved an HETP less than 1 cm. When the same device was applied to the separation of ethane and ethylene at around −10° C. the HETP values doubled. TeGrotenhuis and Powell[18] applied the microwick technique to a horizontal column to separate 3-methylheptane from n-octane at temperatures around 120° C., with reported HETP values as low as 0.33 cm ($N_{stages}$~31). When Bottenus et al.[15] used the same device to perform cryogenic distillation of propane and propylene at around −50° C., the HETP value increased by a factor of three to 1.0 cm. A subsequent study by Bottenus et al. 16 reported HETP values as low as 0.42 cm ($N_{stages}$~60) in the separation of the different carbon isotopes in methane, but performance was still inferior to the theoretical limit of 0.1 cm.

In the work described in the Examples section, the efficiency of cryogenic air separation is tested using three different small scale distillation columns. The performance of a random packed column is compared to the performance of two microchannel distillation columns that use thin wicking structures and gas flow channels to achieve process intensification. The HETP values for each column are compared.

SUMMARY OF THE INVENTION

In a first aspect, the invention provides a distillation apparatus comprising a column having mutually perpendicular dimensions of length, width and thickness, the column comprising: a plurality of adjacent or intersecting flow channels comprising channel walls comprising a first material comprising bonded particles; wherein the first material forms continuous wicking channels along the length of the column; wherein the wicking channels have contiguous porosity along the length of the column formed from interstices between bonded particles; a plurality of open vapor channels bounded by the channel walls and having an open diameter of at least 50 μm along the length of the column and wherein the open vapor channels are not straight such that a straight line cannot be drawn along a 5 cm length of the column through an open vapor channel in the plurality of open vapor channels; wherein the column has a length of at least 5 cm; and an impermeable outer jacket surrounding the flow channels, including the first and second material, in the length direction.

The channel wall is not an extruded polymer and is not formed by a conventional fiber; for example, it is not a hollow-fiber dialysis membrane. Since the channel wall is formed from a powder by additive manufacturing, the elemental composition of the first material is typically isotropic on a mm scale, meaning that the elemental composition of any 2 $mm^3$ volume is the same as any other 2 $mm^3$ volume of the first material.

In another aspect, the invention provides a method of separating a first component from a gas mixture, comprising: passing the gas mixture into a vapor inlet of a distillation apparatus; wherein the distillation apparatus comprises a column having mutually perpendicular dimensions of length, width and thickness, the column comprising: a plurality of adjacent or intersecting flow channels comprising channel walls comprising a wicking structure forming continuous wicking channels along the length of the column; a plurality of open vapor channels bounded by the wicking structure and having an open diameter of at least 50 μm along the length of the column and wherein the open vapor channels are not straight such that a straight line cannot be drawn along a 5 cm length of the column through an open vapor channel in the plurality of open vapor channels; where the wick comprises bonded particles and contiguous porosity along the length of the column formed from interstices the between bonded particles; wherein the column has a length of at least 5 cm; and an impermeable outer jacket surrounding the flow channels, including the wicking material, in the length direction; a liquid inlet connected to wicking material; passing a liquid into the liquid inlet wherein the liquid passes through the continuous wicking channels under the influence of gravity and, optionally, without a siphon; and collecting a vapor from the vapor outlet; wherein the vapor has a concentration of the first component that is higher than the concentration of the first component in the gas mixture. The step of "collecting" means "obtaining" and could be either stored or used in a subsequent unit operation.

For properties of the channel wall, porosity can be determined by microscopy of a cross-section. A gradient can be a gradual gradient or a stepped gradient. The channel wall is typically formed of a single material but could comprise a second material, for example, a material formed by a surface treatment applied to the channel wall after additive manufacturing.

In any of the inventive aspects, the invention can be further characterized by one or any combination of the following: wherein the channel walls are formed from metal particles in an additive manufacturing process; wherein the outer jacket is formed from metal particles in an additive manufacturing process; wherein the flow channels are undulating or helical; wherein the flow channels are adjacent and not intersecting; wherein the channel walls have a gradient of porosity wherein a region adjacent the open vapor channel has a higher porosity as compared to a region in the interior of the channel wall; wherein porosity is defined as pore volume per cubic centimeter (cc); wherein the region adjacent to the open vapor channel is selected to be on one side of the channel wall and is selected to be 20% of the cross-sectional area of a cross-section of a channel wall and the interior region is selected to be the central 40% of the channel wall, and wherein the ratio of (porosity of region adjacent the open vapor channel/porosity of interior region) is at least 1.2, or at least 1.5, or at least 2.0, or in the range of 1.2 to 3; wherein the metal particles are nickel-based; wherein the channel walls are hexagonal; wherein the column has a pressure drop of 0.5 inch of water or less when subjected to a flowrate of 5 SLM of water; wherein the column comprises an first end and a second end at opposite sides of the length of the column and wherein the first end comprises a liquid inlet and a vapor outlet and wherein the second end comprises a liquid outlet and a vapor inlet; wherein the liquid inlet is disposed between the column and a condenser; further comprising a recuperator connected to an air inlet and an air outlet; comprising a vacuum can wherein the column, liquid inlet, vapor outlet, liquid outlet, and vapor inlet are disposed within the vacuum can; wherein the pressure inside the vacuum can is 0.1 atm or less; wherein the flow channels comprise a first portion having a length that is perpendicular to the force of gravity and a second portion having a length that is parallel to the force of gravity; wherein length is defined by the direction of net flow of a fluid, over a length of at least one cm, during operation; wherein the channel walls have a gradient of porosity wherein a region adjacent the open vapor channel has a lower porosity as compared to a region in the interior of the channel wall; wherein porosity is defined as pore volume per cubic centimeter (cc); wherein the region adjacent to the open vapor channel is selected to be on one side of the channel wall and is selected to be 20% of the cross-sectional area of a cross-section of a channel wall and the interior region is selected to be the central 40% of the channel wall, and wherein the ratio of (porosity of region adjacent the open vapor channel/porosity of interior region) is 0.9 or less, or 0.8 or less, or 0.7 or less, or in the range of 0.4 to 0.9.

The invention also includes a method of making a distillation column, comprising: providing a metal powder and using a laser to selectively melt the metal powder to form the column.

The invention further comprises a method of separating a first component from a gas mixture, comprising: passing the gas mixture into the vapor inlet of the distillation apparatus; passing a liquid into the liquid inlet wherein the liquid passes through the continuous wicking channels under the influence of gravity and preferably without a siphon; and collecting a vapor from the vapor outlet; wherein the vapor has a concentration of the first component that is higher than the concentration of the first component in the gas mixture. The invention also includes methods of separating a component from air.

The invention also includes systems (systems are apparatus plus fluids, where the systems can be further defined by the identity of the fluids, the properties of the fluids, conditions, and/or the unit operations that the fluids undergo in the apparatus) that incorporate any of the features described herein. The invention also includes methods of making the apparatus by additive manufacturing comprising building up the structure from a (usually metal) powder into the desired shape and porosity.

Properties and experimental results are disclosed in the Examples section. Processes, systems, and apparatus of the invention can, alternatively or additionally, be characterized by the properties and results described.

Advantages of the invention may include the high level of performance indicated by the HETP, and high thermal conductivity of the metallic channel walls and metallic wicks.

Glossary of Terms

A "capture structure" is a structure disposed (at least partly) within a gas flow channel that assists movement of a liquid into the wick.

"Flow channel" refers to a channel through which a fluid flows during normal operation of an apparatus.

A "fluid mixture" comprises at least two components, one of which will (at least partially) volatilize to form a gaseous phase in a gas flow channel. Typically, a fluid mixture contains a less volatile component (such as water) and a more volatile component (such as $NH_3$).

A "gas flow channel" contains an open flow path for the flow of gas. Preferably, the gas flow channel does not contain a capture structure which is unneeded for desorption and may contribute to liquid lens formation. In some preferred embodiments, the gas flow channel is an open flow path from an inlet to an outlet with no intervening filters or other materials. Preferably, a gas flow channel is a microchannel.

The heat exchanger is preferably a laminated device. A "laminated device" is a device having at least two nonidentical layers, wherein these at least two nonidentical layers can perform a unit operation, such as heat transfer, desorption, etc., and where each of the two nonidentical layers are capable having a fluid flow through the layer. In the present invention, a laminated device is not a bundle of fibers in a fluid medium. In preferred embodiments, a laminated device is formed from at least 10 sheets, with each sheet having a thickness of less that 1 cm, preferably less than 5 mm.

A "liquid" is a substance that is in the liquid phase within the wick under the relevant operating conditions. The liquid can comprise (but is not limited to) water, liquified air, nitrogen, alcohol, and/or a hydrocarbon such as ethane. The gas can comprise (but is not limited to) a noble gas such as xenon, oxygen, methane, carbon dioxide, or ammonia.

A "liquid flow path" is a wick through which a liquid flows during operation of a device.

"Microchannel" refers to a channel having at least one dimension of 5 mm or less, preferably 2 mm or less, and in some embodiments 1 to 5 mm. The length of a microchannel is defined as the furthest direction a fluid could flow, during normal operation, before hitting a wall. The width and thickness are perpendicular to length, and to each other, and, in laminated devices, width is measured in the plane of a shim or layer.

"Pore size" is volume average pore size. This can be measured by known techniques such as optical or electron microscopy, or mercury porosimetry.

"Residence time" refers to the time that a fluid occupies a given working volume.

The invention is often characterized by the term "comprising" which means "including," and does not exclude additional components. In narrower aspects, the term "comprising" may be replaced by the more restrictive terms "consisting essentially of" or "consisting of."

DETAILED DESCRIPTION OF THE INVENTION

Figure 1:
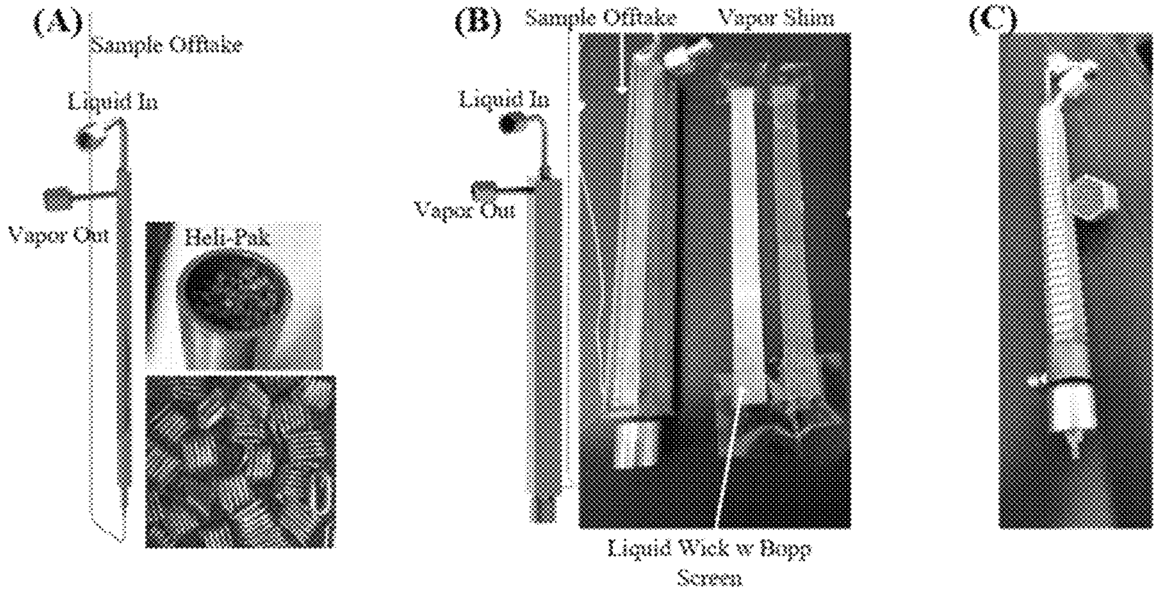
FIG. 1 shows side-by-side view of the three columns. (A) The traditional packed column with Heli-Pack packing. (B) The PTL device alongside sample layers of liquid wick and vapor shim. (C) The additively manufactured porous honeycomb (AMPH) column.

The channel walls can have a wick adjacent the vapor flow channel and a dense portion attached to the wick; however, more commonly the channel wall is porous throughout. The channel wall can have uniform porosity throughout its thickness or a porosity gradient as a function of thickness. The gradient can be gradual or stepped. In some embodiments, the channel walls have a gradient of porosity wherein a region adjacent the open vapor channel has a higher porosity as compared to a region in the interior of the channel wall; wherein porosity is defined as pore volume per cubic centimeter (cc); wherein the region adjacent to the open vapor channel is selected to be on one side of the channel wall and is selected to be 20% of the cross-sectional area of a cross-section of a channel wall and the interior region is selected to be the central 40% of the channel wall, and wherein the ratio of (porosity of region adjacent the open vapor channel/porosity of interior region) is at least 1.2, or at least 1.5, or at least 2.0, or in the range of 1.2 to 3.

In another embodiment, the channel walls have a gradient of porosity wherein a region adjacent the open vapor channel has a lower porosity as compared to a region in the interior of the channel wall; wherein porosity is defined as pore volume per cubic centimeter (cc); wherein the region adjacent to the open vapor channel is selected to be on one side of the channel wall and is selected to be 20% of the cross-sectional area of a cross-section of a channel wall and the interior region is selected to be the central 40% of the channel wall, and wherein the ratio of (porosity of region adjacent the open vapor channel/porosity of interior region) is 0.9 or less, or 0.8 or less, or 0.7 or less, or in the range of 0.4 to 0.9. For these properties of the channel wall, porosity can be determined by microscopy of a cross-section. The gradient can be a gradual gradient or a stepped gradient. The channel wall is typically formed of a single material but could be a second material that could be formed by a surface treatment applied to the channel wall after additive manufacturing.

The channel wall, including wick, has a thickness of at least 5 μm, or at least 10 μm, or at least 50 μm, or between 10 and 300 μm. The channel walls (and wicks if different from other materials in the channel wall) can be formed from a variety of metals, including iron, titanium, gold, silver, copper, aluminum, and nickel, and alloys comprising one or more metals. Another material option is intermetallics formed from two or more metals placed in intimate contact during a bonding process and which combine to form an alloy, compound, or metal solution. Preferred intermetallics will have properties very similar to the ceramic materials. The walls/wicks may also be composite materials with mixtures of metals and non-metals to form materials such as cermets. The channel walls may also be formed of polymer.

A wick is a material that will preferentially retain a wetting fluid by capillary forces and through which there are multiple continuous channels through which liquids may travel by capillary flow. The capillary pore size in the wick can be selected based on the contact angle of the liquid and the intended pressure gradient in the device, and the surface tension of the liquid. Preferably, the pressure differential across the wick during operation should be less than the breakthrough pressure—the point at which gas will intrude into the wick displacing the liquid—this will exclude gas from the wick.

A liquid preferentially resides in the wick due to surface forces, i.e., wettability, and is held there by interfacial tension. Flooding can result from exceeding the flow capacity of the device for wetting phase through the wick. The flow capacity is determined by the fluid properties, the pore structure of the wick, the cross-sectional area for flow, and the pressure drop in the wick in the direction of flow.

A wick preferably has a pore size of 10 nm to 1 mm, more preferably 100 nm to 0.1 mm. For wicking materials, the objective is to provide materials that have high permeability and small pore structure, in order to obtain high flow rates while also supporting a significant pressure drop down the wick (the maximum pressure drop decreases with increasing pore size). For devices where liquid phase mass transfer limits processing throughput, the thinness of the wick material is also important for process intensification. In some embodiments, the thickness of a wick is less than 500 micrometers (μm), more preferably less than 100 μm, and in some embodiments between 50 and 150 μm.

In operation of a device with a wick, the wick should not be flooded, and it is preferably not dry. A wet or saturated wick will effectively transport liquid through capillary forces to a low pressure zone, such as low pressure created by suction or other means of creating a pressure differential. The inventive devices can be operated so that liquid flows in the direction of gravity, and gas can flow countercurrent—in this configuration, the devices can operate with or, preferably, without suction.

A capture structure can be provided (at least partly) within the gas flow channels, and in liquid contact with the wick. A capture structure assists in removing (capturing) a liquid from the gas stream. One example of a capture structure are cones that protrude from the wick; liquid can condense on the cones and migrate into the wick. Other capture structures include inverted cones and fibers such as found in commercial demisters or filter media.

Flow channels (also called vapor flow channels) are adjacent to the wicks. Flow channels can intersect with other flow channels or they can be non-intersecting (e.g., the hexagonal channel shown in the examples). Preferably, in a column, there are at least 4 flow channels and 4 channel walls; in some embodiments, at least 10 flow channels and 10 channel walls; in some embodiments, at least 100 flow channels and 100 channel walls. The open channels have a thickness of at least 50 μm, or at least 100 μm, or at least 500 μm, or between 100 and 500 μm. An open channel is preferably 100% open but may contain capture structures that decrease open volume to at least 60%, or at least 80%, or in the range of 90 to 100% or in the range of 99-100%. The open volume (porosity) of the channel wall is at least two times less, preferably at least 5 times less, more preferably at least 10 times less, than that of the open channel. As is the case throughout these descriptions, thickness is perpendicular to length and length is the direction of flow through the column.

During operation of a system, the gas phase is contiguously connected to the gas outlet and the liquid phase is contiguously connected from the liquid flow path to the liquid outlet. The continuity of phases at the gas outlet is affected by the geometry, the total flow and ratio of gas to liquid flow, and the fluid physical properties. A second desired condition is sufficient wicking capacity, which is influenced by the flow area, fluid physical properties, and the permeability of the material.

During operation, a liquid mixture can be fed into the wick. Typically, the mixture is fed into the top of a column and flows downward under the force of gravity. The liquid mixture contains at least one component that partitions into the gas flow channel while another component remains as a liquid in the wick. The liquid can comprise (but is not limited to) water, liquified air, nitrogen, alcohol, and/or a hydrocarbon such as ethane. The gas can comprise (but is not limited to) a noble gas such as xenon, oxygen, methane, carbon dioxide, or ammonia.

Typically, fluids entering and/or exiting the column at pretreated (and/or post-treated) to control temperature. This is conventionally done in a heat exchanger. In the preferred type of heat exchangers, the primary heat transfer surfaces are the walls in the heat exchangers and between fluid flow paths. Walls between channels in a heat exchanger can act as heat exchange fins, and thus provide extended heat transfer surface area. Walls within a heat exchanger can also provide structural support. For good thermal transport, walls between layers are preferably 500 μm thick or less; in some embodiments in the range of 100 to 500 μm. Fluid flowing through the heat exchanger channels can be a liquid (for example, water) or a gas. In some embodiments, a fan or blower moves gas through the cooling channels. In some preferred applications of the present invention, it is desired to use a gas as the heat exchange fluid. In this case, the majority of the heat transfer resistance can be in the heat exchange channel. In some embodiments, a configuration with an extended heat transfer surface in the heat exchange channels is preferred.

EXAMPLES

Three different small scale distillation devices were tested: one with traditional random packing, one with microwick plate-type layering (similar to previous PNNL work), and one with a new microchannel porous honeycomb internal structure built via additive manufacturing. All three are shown in FIG. 1.

All three columns were built with an active height of 25.4 cm and were operated at 1 atm. Swagelok fittings and additional tubing were welded to each column to provide a liquid inlet, an overhead vapor outlet, and a bottoms liquid outlet. The oxygen-rich reboiler liquid was withdrawn, and the composition determined using a residual gas analyzer. The reboiler liquid level was maintained by monitoring the temperature at different reboiler positions, and reboiler power was supplied via a 20 W electrical heater attached to the outside or the reboiler.

Previous cryogenic experiments with PNNL MCD microwick devices were conducted in an insulated cold box, with the required operating temperatures maintained by periodically spraying liquid nitrogen inside the box. This required significant quantities of liquid nitrogen; one 24-hour experiment consumed multiple 180 L dewars. It also made simultaneous control of both the cold box temperature and the condenser duty difficult. To avoid these difficulties, in the present work each distillation system was placed inside a vacuum can, which provides more efficient insulation. A Stirling Cryocooler (SunPower CryoTel® GT) was used as a cooling source, rather than liquid nitrogen.

Traditional Random Packing (TRP)

The traditional packed column was a vertical cylinder with an inside diameter of 1.09 cm. It was filled with stainless steel Heli-Pak packing distributed randomly. Liquid entered near the top of the column and flowed downward through the packing. This TRP device is representative of a typical small, packed column and served as a benchmark against which to compare the other two columns.

Plate-Type Layering (PTL)

Figure 2:
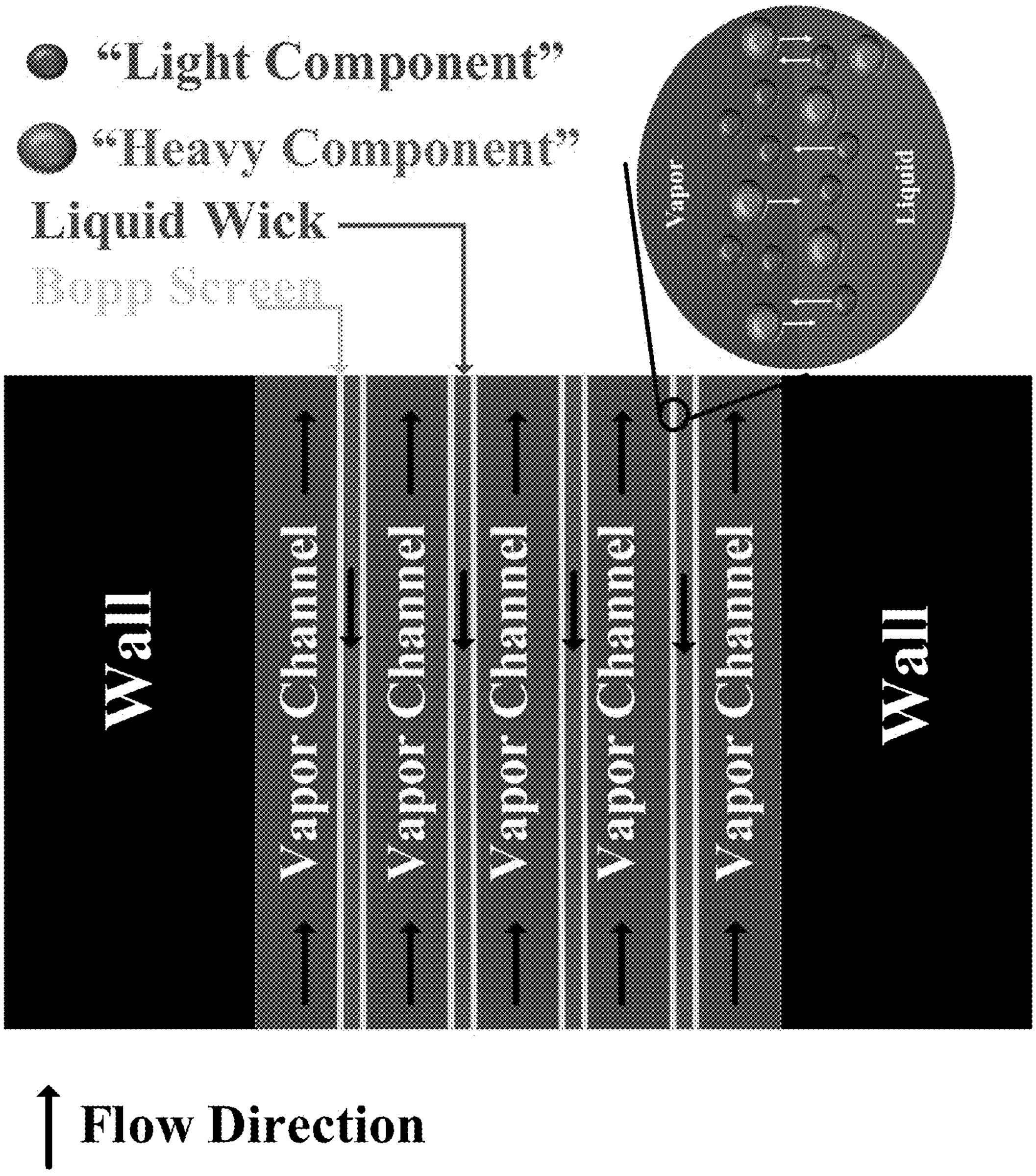
FIG. 2 shows sample layer arrangement in the plate-type MCD. The circle at the top right shows transfer of the heavy component to the liquid and light component into the vapor phase.

The PTL column was built in the shape of a rectangular prism, with inner dimensions of 1.9 cm×1.9 cm. It used an arrangement similar to that of previous PNNL microwick device; however, unlike previous PNNL microwick experiments this device was operated in a vertical as opposed to horizontal direction. Internally, it was configured with a specific arrangement of three different types of materials: thicker vapor channels (0.05 cm), thinner liquid wicks (0.01 cm), and fine screens (~38 μm). The vapor channels and liquid wicks were expanded metal screens, and the materials were layered as shown in FIG. 2, with each layer extending from the top to the bottom of the column.

The layers followed a vapor-liquid-vapor pattern, with each liquid wick sandwiched between two fine screens. The overall arrangement included 29 vapor channels, 28 liquid wicks, and 56 fine screens. The vapor channels were filled with stainless-steel mesh with larger openings to provide a non-wicking region for vapor flow. The fine screens were Bopp SDS PLUS 53/24 woven mesh and served to prevent intrusion of the vapor into the liquid wicks. The vapor and liquid wicking screens were pressed together into the rectangular housing, and the side and ends of the device were sealed by welding. A small section at the bottom of the column was left empty for the bottoms liquid to accumulate.

Additively-Manufactured Porous Honeycomb (AMPH)

Figure 3:
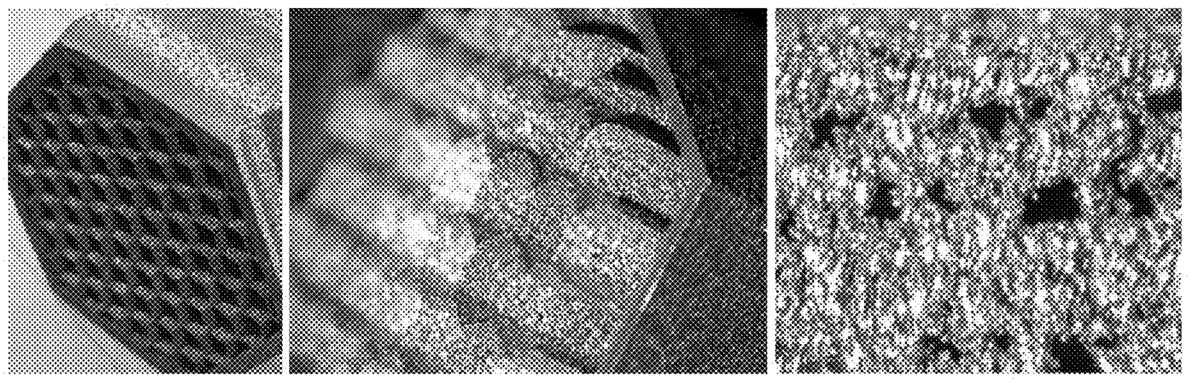
FIG. 3 shows images of the AMPH device at 1× (left), 20× (center), and 235× (right) magnification.

The third device is new to this work and is referred to as the additively-manufactured porous honeycomb (AMPH) column. Its structure is shown in FIG. 3.

The column is comprised of an internal solid framework surrounded by a solid outer shell. The framework is built of porous walls that are ~150 μm thick. The framework has a hexagonal honeycomb-like structure, and in the vertical direction it follows an undulating pattern to minimize the possibility of liquid droplets falling through the device without interacting with the wicking structures. This undulation generates the wave-like surface of the outer shell (FIG. 1 (C)). The outer wall thickness is 0.1 cm and the width is 23 mm.

The column was first designed in CAD software (SolidWorks 2019) and then manufactured via an additive printing process that employs direct metal laser sintering (DMLS): a laser melts metal powder one layer at a time, gradually building on previous layers until the entire structure is completed. The internal honeycomb is a high-porosity metal scaffold created by scanning the laser quickly and at a heat intensity that is too low to completely melt the metal powder. The solid outer shell is made with laser power and scan settings that produce high-density, non-permeable metal. The manufacturing was performed by i3DMFG™ and printed with nickel-based Inconel 625 using custom print settings.

Distillation System

Figure 4:
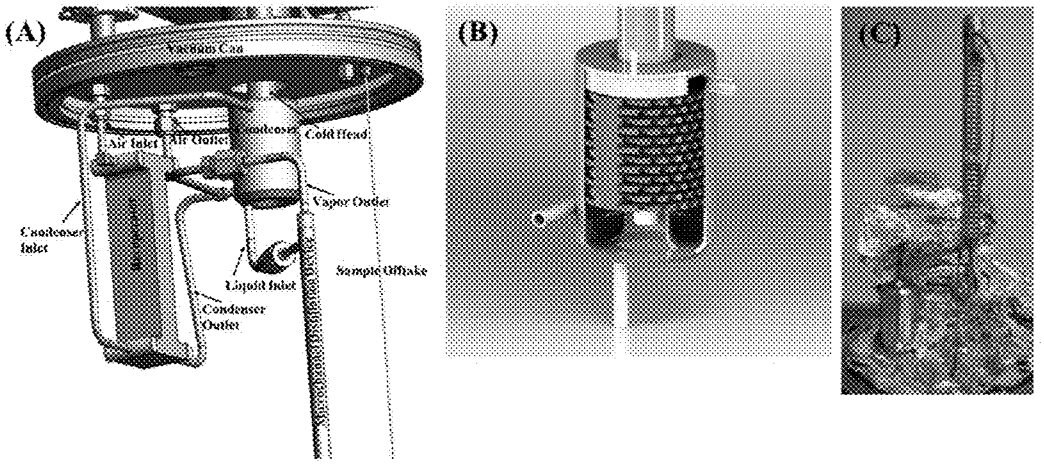
FIG. 4 shows (A) CAD model of the portion of the MCD system contained within the vacuum can. (B) CAD model of the custom-built condenser. (C) Image of the MCD system with the vacuum can lid lying on a flat surface.

The distillation system consists of a microchannel recuperator to precool the incoming air, a custom made condenser that attaches to the cold head of the stirling cryocooler, the distillation column, and a vacuum can to contain these components and provide thermal insulation. The same vacuum can, condenser, and recuperator were used for all experiments, with the distillation column being changed for each set of tests. The system configuration is shown in FIG. 4.

The incoming air is dried and $CO_2$ removed using adsorption cartridges containing 13X molecular sieve material. Mass flow controllers are used to control the flowrate of the incoming air and the bottoms stream exiting the reboiler. The condenser—shown in FIG. 4(B)—contains a heat transfer surface custom-machined from a copper block contained in a stainless-steel housing. It was situated around and attached to the cold head of the cryocooler, a Sunpower CryoTel® GT 16 W unit. During testing, the cryocooler cold head operated around 77 K (−196° C.), at which temperature it provided 16 W of lift (per manufacturer specifications). The feed entered the bottom of the condenser and the nitrogen rich gas exited to top of the condenser. To provide thermal insulation, the heat exchanger (recuperator), column (microchannel distillation device), and condenser were all enclosed within the vacuum can. The recuperator includes an air inlet and air outlet. A conduit (condensor inlet) between the recuperator and condensor carries fluid from the recuperator to the condenser. The pressure inside the can was maintained below $10^{-4}$ torr, the pieces of equipment inside the vacuum can were each wrapped in 5-10 layers of 500 DM cryogenic laminate (multi-layer insulation). Swagelok and flange fittings were used for all connections. Type K thermocouples were placed on the inlet and outlet of the various components to monitor temperatures throughout the system. Opto 22 software was used to monitor the temperatures, flowrates, and pressures inside the vacuum can, as well as the pressure of the process fluid in the distillation system. The power inputs to the cryocooler and the reboiler were also modulated using Opto 22. A vacuum pump was connected to the reboiler for continuous removal of liquid. The flow rate was measured by a mass flow controller and verified with a Mesa Labs Definer 220-L DryCal. A small sample of the reboiler vapor was periodically withdrawn and sent to the Dycor residual gas analyzer (RGA) for compositional analysis. The RGA pulls samples at vacuum-like pressures, so the gas was assumed to be ideal. Consequently, the total pressure P was assumed to equal the sum of the individual species partial pressures $P_i$, and the species mole fractions $y_i$ were assumed to be directly proportional to the species partial pressures (i.e., $y_i=P_i/P$).

Process Flow

Atmospheric air was first processed through the adsorption cartridges. The $CO_2$ free dry air is then pre-cooled in the recuperator inside the vacuum can. The cooled dry air then flows into the condenser and was partially condensed. The uncondensed vapor—mostly nitrogen—flows back through the heat exchanger. The condensed liquid collects in the bottom of the condenser and then flows into the column through the liquid inlet, passes down through the column, and is eventually collected in the reboiler. Along the way, it interacted continuously with the upward moving vapor produced in the reboiler. The less volatile components—primarily oxygen and argon but containing other heavy components such as xenon—became concentrated in the liquid, while the more volatile nitrogen became concentrated in the vapor and flows out through the vapor outlet. A portion of the liquid in the reboiler was periodically withdrawn (via sample offtake) and sampled.

Operation

During startup, the reboiler is turned off while waiting for the system to cool down to operating temperatures. This cooling process took a couple of hours. All three columns were tested under similar conditions with maximum reflux to compare separation efficiency. For these tests, the feed air flow rate was fixed at 1 SLM (standard volumetric flow) and the flow rate of the bottoms liquid product was kept below 0.01 SLM (also standard volumetric flow). The AMPH device was also tested to determine the maximum flow of oxygen-rich product (minimum mole fraction 0.90) that could be produced by the equipment. For these tests the feed air flow rate was fixed at 5 SLM and the bottoms liquid product flow was adjusted from 0.140 to 0.400 SLM in increments of 0.054 SLM.

Modeling

Figure 5:
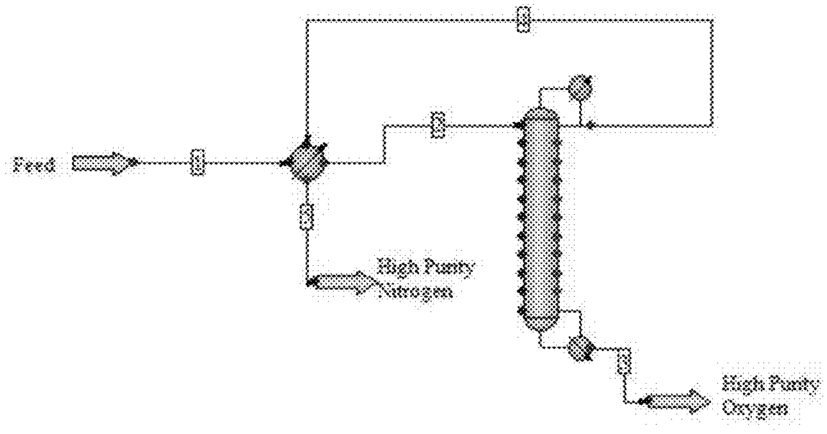
FIG. 5 shows a flowsheet for the process simulation model used to simulate the MCD system.

The MCD system was modeled using process simulation software, the flowsheet for which is shown in FIG. 5. This is a very simple model, consisting of only a heat exchanger to model the recuperator and a distillation column to model the MCD column.

For all model runs the feed stream (stream 1 in the figure) was configured with a temperature of 25° C., a pressure of 1 atm, and a molar fractional composition representative of common air (0.78 $N_2$, 0.21 $O_2$, 0.01 Ar). This stream was also configured to enter the column at stage 1. The temperature of the nitrogen-rich outlet stream from the heat exchanger (stream 5) was set to −2° C. This value was based on measurements from the experiments and indicated a 27° C. difference between the hot side inlet and cold side outlet for the exchanger. To ensure the model results were not dependent on any single simulator, the model was executed in three different software packages: CHEMCAD (v7.1.6), Aspen HYSYS V11, and DWSIM (v6.7.1). The Peng-Robinson equation of state (EOS) was used for all thermodynamic calculations.

To model the separation efficiency (which, again, was focused on comparing the separation efficiency of the three different columns), the standard volumetric flow rates of the feed (stream 1) and bottoms liquid product (stream 3) were set to 1.0 and 0.01 SLM, respectively, and the condenser duty was fixed at −16 W. The number of stages in the model column was adjusted from 2 to 20, and the composition of the bottoms liquid product was recorded for each stage. The number of theoretical stages of separation achieved by each MCD column was then determined by matching the composition measured in the experiments to that of the model.

To model the maximum oxygen production the standard vapor volumetric flow of the feed (stream 1) was increased to 5 SLM, the number of column stages was fixed at 8, the condenser duty was initially kept at −16 W, and the standard vapor volumetric flow of the bottoms liquid product (stream 5) was incremented from 0.1 SLM until the oxygen mole fraction in this stream fell below 0.90.

Results and Discussion

Before discussing the performance of the three devices, a few observations are of note. First, previous PNNL MCD microwick devices[15, 16] had been operated in the horizontal direction, with liquid flow manipulated via siphons. Balancing all process parameters to achieve steady-state operation with these devices had required significant effort. Operating the PTL column vertically in this work proved to be more straightforward, with no additional equipment required to promote fluid flow. While this is an important improvement, it does come at one cost: the flow rate at low flows cannot be controlled as precisely as with the horizontal device. Where very low flows are important, future work with AMPH columns could include both horizontal structures to aid in separation efficiency and vertical features to aid in operation, a sort of hybrid between gravity-driven flow and capillary flow from wicking.

Second, the use of a vacuum can and a cryocooler-rather than a cold box with liquid nitrogen-led to a significant reduction in both heat losses and temperature fluctuations. This made the system more robust and easier to operate than previous systems.

Separation Efficiency Tests

Figure 6:
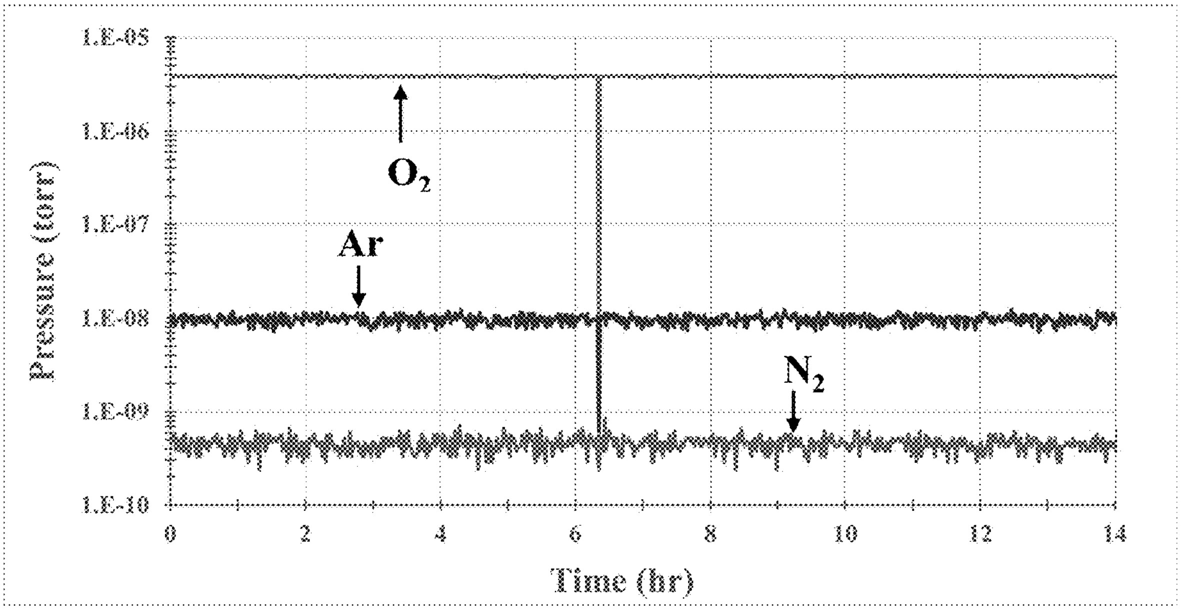
FIG. 6 shows sample measured data for the bottoms product of the AMPH column, with the partial pressure of each component shown as a function of time. The momentary drop in values at around 6 hours was the result of a temporary instrument failure.

FIG. 6 shows a sample of the experimental results during separation efficiency tests for the AMPH column. Note that the pressure values show the partial pressures measured in the residual gas analyzer that operates at vacuum conditions. These partial pressure measurements provide information about the relative amount of each species exiting the reboiler.

In this plot the average partial pressures for oxygen and argon are $3.9 \cdot 10^{-6}$ and $9.6 \cdot 10^{-9}$ torr, respectively, corresponding to mole fractions of 0.9975 and 0.0025. Apart from a momentary instrument failure shortly after the 6-hour mark, the measurements showed little variation. For example, the standard deviation for the argon partial pressure over the final 4 hours is $1.0 \cdot 10^{-9}$ torr. Adding one standard deviation in either direction of the mean gives an estimate of 0.0022 to 0.0027 for the argon mole fraction.

The plot also shows that the nitrogen partial pressure remained low throughout the process, indicating that virtually all the nitrogen in the feed was exiting in the overhead vapor. Values for other trace components in air (e.g., neon, krypton, and xenon) were measured as well, but their values all remained below those of nitrogen and are not shown here. In order to collect these trace components, the reboiler flow would need to be turned off to allow these noble gases to accumulate.

Comparable measurements for the PTL column showed an argon mole fraction of 0.0068 (±0.0001), with just a small amount of nitrogen ($0.0004 \pm 10^{-5}$). Measurements for the TRP column showed mole fractions of around 0.0090 for both argon and nitrogen.

Figure 7:
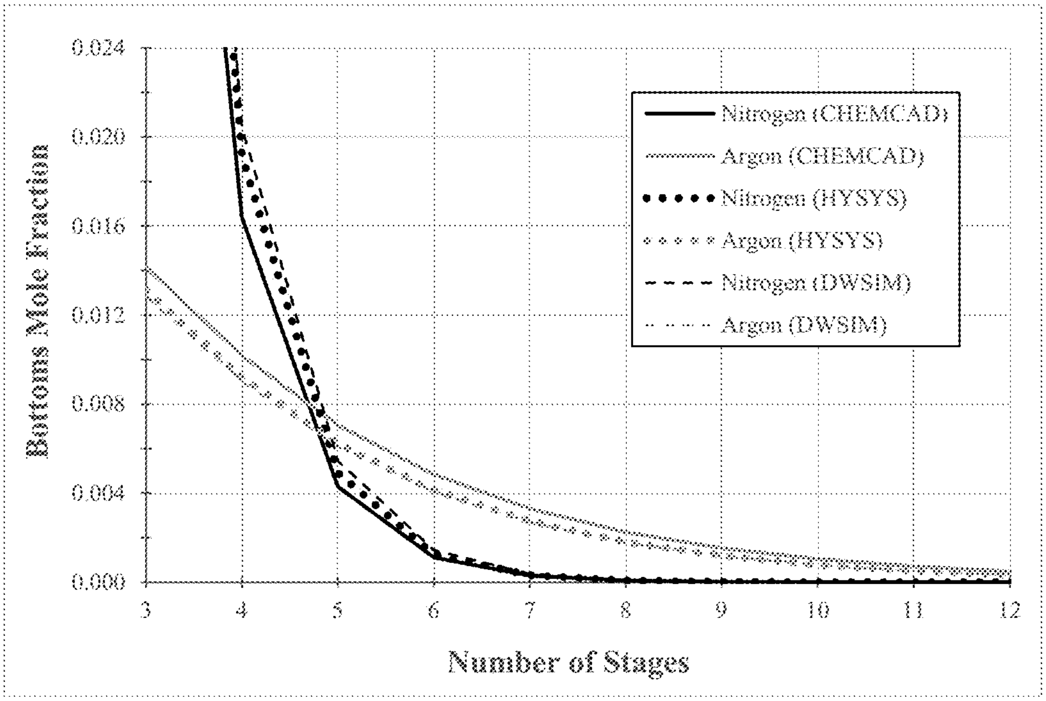
FIG. 7 shows results for the CHEMCAD, Aspen HYSYS, and DWSIM simulation models. All three agree to within reasonable accuracy.

Results for the three different simulation models are shown in FIG. 7. These are sufficiently similar to allow a determination of the number of ideal stages equivalent for all three. Thus, the conclusions below are not dependent on a single simulator.

Figure 8:
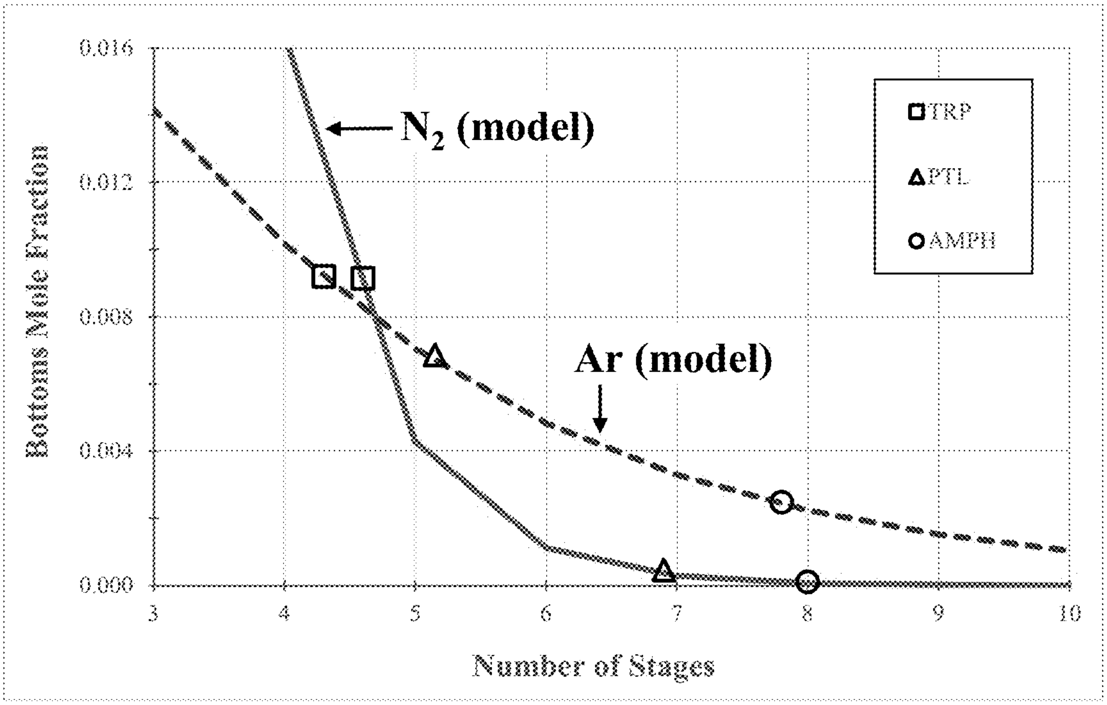
FIG. 8 shows results for the bottoms liquid composition of the three MCD columns. The solid and dashed lines indicate values from the ideal stage model for nitrogen and argon, respectively, while points indicate the experimentally measured values for each respective column. The number of stages includes the condenser and reboiler, each of which represents one ideal stage.

FIG. 8 compares the results for each column with the ideal stage model. For the TPR column both the argon and nitrogen values match the model at around 4.5 stages. For the PTL column the argon and nitrogen values match the model at around 5 and 7 stages, respectively, while for the AMPH column both argon and nitrogen match at around 8 stages.

These results are summarized in Table 1. Note that the HETP values referenced previously in this work apply to the separation of binary mixtures, where a single value is sufficient to describe the separation of the two components. Air, however, is a mixture of more than just two components, so the results are presented here in terms of separate HETP values for nitrogen and argon.

TABLE 1

Results for each MCD column. HETP values are relative to a column height of 25.4 cm, and are thus in units of cm.

| | Nitrogen | | | Argon | | |
|---|---|---|---|---|---|---|
| MCD column | y | $N_{stages}$ | HETP | y | $N_{stages}$ | HETP |
| TRP | 0.0091 | 4.6 | 5.5 | 0.0092 | 4.3 | 5.9 |
| PTL | 0.0005 | 6.9 | 3.7 | 0.0071 | 5.2 | 4.9 |
| AMPH | 0.0001 | 7.9 | 3.2 | 0.0025 | 7.8 | 3.3 |

The HETP values for the TRP column (5.6 cm for nitrogen, 5.9 cm for argon) are consistent with a previous study[28] that used similar random packing for nitrogen-argon separation. HETP values for the PTL column are lower (3.7 cm for nitrogen, 4.9 cm for argon), while those for the AMPH column are the lowest (3.2 cm for nitrogen, 3.3 cm for argon). Thus, the AMPH column is the most effective of the three. This increase in separation efficiency with the same column height is an example of process intensification through improvement of the gas liquid interface in the column.

Figure 9:
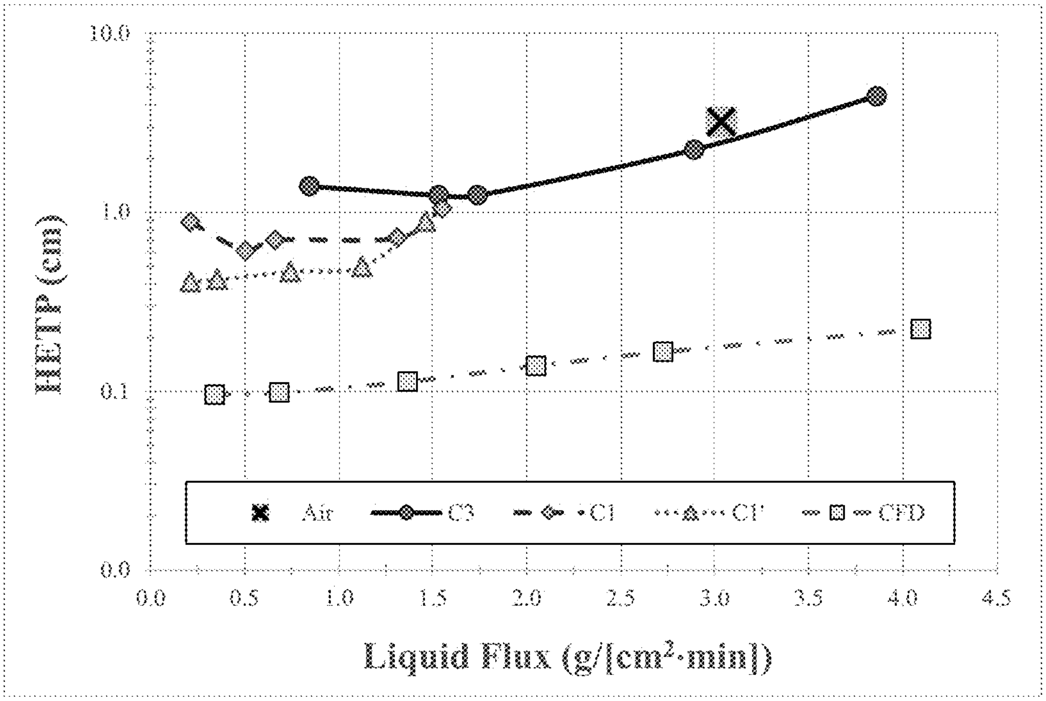
FIG. 9 shows a comparison of the HETP values obtained from various PNNL MCD devices, each as a function of mass flux. Note the logarithmic scale for the HETP values. The data for this figure is taken from a previous publication 17, with one point (Air) from the current work added for reference. C3 refers to propane/propylene separation with a 10.2 cm device; C1 and C1' are for methane isotope separation with a 10.2 and 25.4 cm device, respectively; and CFD is for a computational fluid dynamics simulation based on the propane/propylene separation in the 10.2 cm long PTL device with liquid wicks and vapor channels with heights of 100 mm and 500 mm, respectively.

FIG. 9 shows how the result for the AMPH column (3.2 cm) is consistent with HETP values from previous PNNL MCD studies. In general, HETP values increase with mass flux.

Reboiler Outlet Flow Testing

Figure 10:
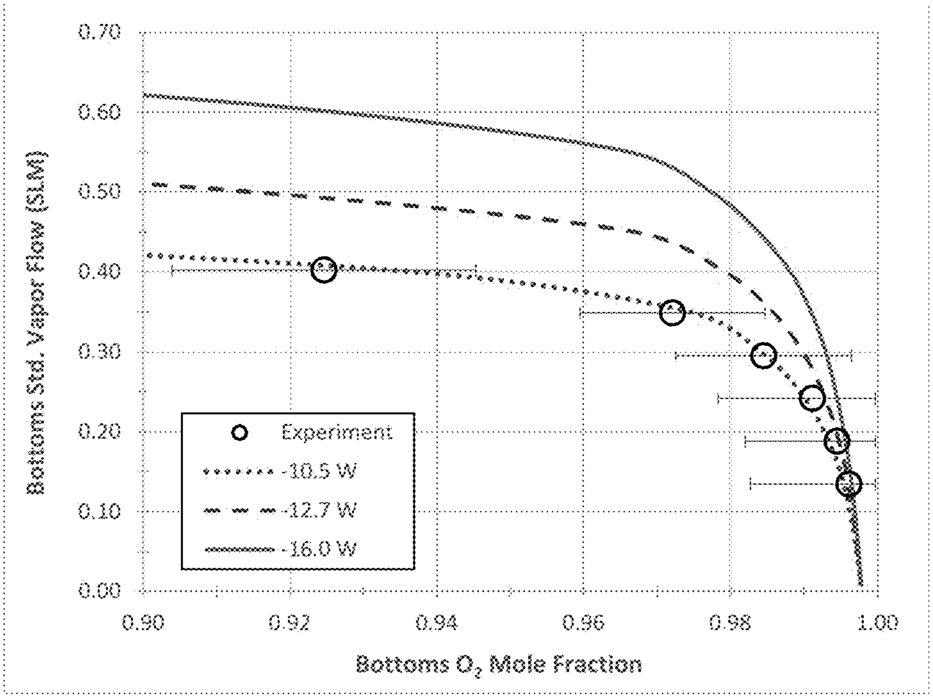
FIG. 10 shows results reboiler outlet flow tests. Circles represent experimental measurements, with solid horizontal error bars indicating one standard deviation in either direction. The lines indicate values from the ideal stage model at three different condenser duties.

FIG. 10 shows the experimental measurements and model predictions for testing to determine the maximum reboiler outlet flow. The experimental values show that the AMPH column used in this work is capable of producing up to about 0.4 SLM of product containing at least 90% oxygen. Assuming an electricity cost of $0.05/kWh, this corresponds to about $0.02/kg of product.

Comparing the experimental measurements to the base model predictions (condenser duty—16 W), noticeable deviation is evident at bottoms liquid flow rates above about 0.20 SLM. One source of this discrepancy could be the that the cryocooler was not actually providing the full advertised duty provided by the manufacturer. Accordingly, a separate experiment was performed to measure the cryocooler duty.

Figure 11:
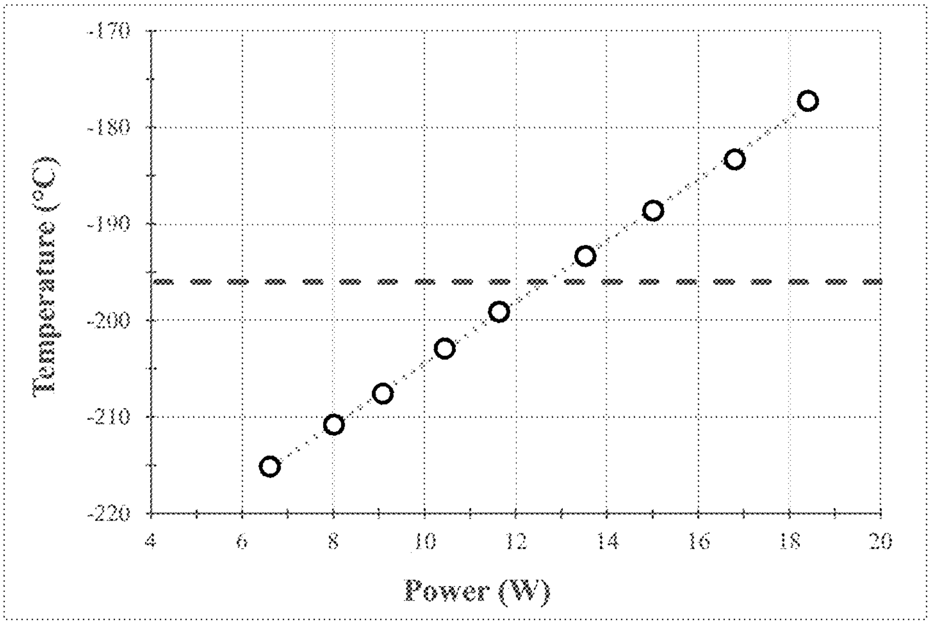
FIG. 11 shows performance data for the cryocooler. Circles indicate the experimental data, the dotted line shows a linear fit to the data, and the dashed line indicates the operating temperature for the cryocooler in the MCD system.

A 5Ω resistor was mounted to the cryocooler and 9 different voltages between 6 and 10 V were applied through the resistor. At each voltage the cryocooler temperature was measured via a thermocouple, and once the temperature stabilized the current was measured. The results are shown in FIG. 11, with power (P) calculated from the current (I) and resistance (R) via $P = I^2R$.

These results suggest that the cryocooler was providing about 12.7 W of duty to the condenser during MCD operation, which is 3.3 W less than the manufacturer's specifications. Reducing the condenser duty in the model to 12.7 W improves the fit with the experimental data, but there is still some disagreement. Reducing the duty in the model to 10.5 W allows the model to agree closely with the data. This additional 2.2 W difference is likely the result of parasitic heat losses (i.e., losses that result from imperfect insulation of the process).

One note about these results. The condenser duty in the model has only minimal impact when the bottoms flow rate is small. Since the modeling and experiments used to determine column efficiency was performed at small bottoms flow rates, this finding about the actual condenser duty had no impact on the determination of the HETP values for each column. The work described here demonstrates that, relative to traditional random packing, the separation efficiency of oxygen from air in an MCD column can be greatly enhanced by using a custom AMPH internal structure. This enhanced efficiency results from the porous liquid wicking structures present in the AMPH column itself, not to anything unique to air separation.

Accordingly, this approach can reasonably be expected to improve efficiency in other types of distillation systems as well. This enhanced efficiency is an enabling technology for small scale gas separations including the collection of xenon from the atmosphere.

AM allows internal structures to be constructed that are not available via traditional manufacturing techniques. Future work in distillation could continue to explore other structural changes to improve mass transfer. Further, the improvement observed here suggests that AM could be applied to other processes for similar improvement. The efficiency and/or selectivity of an adsorption process could be improved by controlling the microstructure of the adsorbent via AM. Similarly, AM could be used to create heat exchangers with internal flow structures that optimize heat transfer in ways not heretofore possible.

The principles that allow the AMPH MCD column to improve separation efficiency should scale up to larger distillation systems, but current DMLS equipment constrains the maximum part size that can be fabricated. For example, the i3DMFG™ EOS® M400.4 platform used in this work is a 40×40×40 cm cube, so the part must fit within those dimensions. Also, in a distillation column the fluid entering the column must be properly distributed across its entire width. In columns with small widths—such as those tested in this work—this is straightforward and requires no special design, but with a larger device this would likely require a specialized header to distribute uniform liquid flow to the wicking structures.

REFERENCES

1. Avasthi A, Bowyer T W, Bray C, et al. Kiloton-scale xenon detectors for neutrinoless double beta decay and other new physics searches. *Phys Rev D*. Dec. 20 2021; 104(11) doi: ARTN 112007 10.1103/PhysRevD.104.112007
2. Bowyer T W. A Review of Global Radioxenon Background Research and Issues. *Pure Appl Geophys*. July 2021; 178(7):2665-2675. doi:10.1007/s00024-020-02440-0
3. Hashim S S, Mohamed A R, Bhatia S. Oxygen separation from air using ceramic-based membrane technology for sustainable fuel production and power generation. *Renewable and Sustainable Energy Reviews*. 2011; 15(2):1284-1293. doi:https://doi.org/10.1016/j.rser.2010.10.002
4. Hinchliffe A B, Porter K E. A Comparison of Membrane Separation and Distillation. *Chemical Engineering Research and Design*. 2000; 78(2):255-268. doi:https://doi.org/10.1205/026387600527121
5. Hu T, Zhou H, Peng H, Jiang H. Nitrogen Production by Efficiently Removing Oxygen From Air Using a Perovskite Hollow-Fiber Membrane With Porous Catalytic Layer. Original Research. *Frontiers in Chemistry*. 2018 Aug. 6 2018; 6(329)doi:10.3389/fchem.2018.00329
6. Koros W J, Mahajan R. Pushing the limits on possibilities for large scale gas separation: which strategies? *Journal of Membrane Science*. 2000 Aug. 10/2000; 175(2):181-196. doi:https://doi.org/10.1016/S0376-7388(00)00418-X
7. Yoshida S, Ogawa N, Kamioka K, Hirano S, Mori T. Study of Zeolite Molecular Sieves for Production of Oxygen by Using Pressure Swing Adsorption. *Adsorption*. 1999 Jan. 1 1999; 5(1):57-61. doi: 10.1023/A:1026402425399
8. Ziogas A, Cominos V, Kolb G, Kost H J, Werner B, Hessel V. Development of a Microrectification Apparatus for Analytical and Preparative Applications. *Chem Eng Technol*. January 2012; 35(1):58-71. doi: 10.1002/ceat.201100505.
9. MacInnes J M, Zambri M K S. Hydrodynamic characteristics of a rotating spiral fluid-phase contactor. *Chem Eng Sci*. Apr. 14, 2015; 126:427-439. doi:https://doi.org/10.1016/j.ces.2014.12.036.
10. Lam K F, Sorensen E, Gavriilidis A. Review on gas-liquid separations in microchannel devices. *Chem Eng Res Des*. October 2013; 91(10):1941-1953. doi:https://doi.org/10.1016/j.cherd.2013.07.031.
11. Yang R J, Liu C C, Wang Y N, Hou H H, Fu L M. A comprehensive review of micro-distillation methods. *Chem Eng J*. Apr. 1, 2017; 313:1509-1520. doi: 10.1016/j.cej.2016.11.041.
12. Mardani S, Ojala L S, Uusi-Kyyny P, Alopaeus V. Development of a unique modular distillation column using 3D printing. *Chemical Engineering and Processing—Process Intensification*. 2016 Nov. 1/2016; 109:136-148. doi:https://doi.org/10.1016/j.cep.2016.09.001.
13. Neukäufer J, Hanusch F, Kutscherauer M, Rehfeldt S, Klein H, Grützner T. Methodology for the Development of Additively Manufactured Packings in Thermal Separation Technology. *Chem Eng Technol*. 2019; 42(9):1970-1977. doi:https://doi.org/10.1002/ceat.201900220.
14. Neukäufer J, Sarajlic N, Klein H, et al. Flexible distillation test rig on a laboratory scale for characterization of additively manufactured packings. *Aiche Journal*. 2021; doi: 10.1002/aic. 17381.
15. Bottenus D, Caldwell D, Fischer C, et al. Process intensification of distillation using a microwick technology to demonstrate separation of propane and propylene. *Aiche Journal*. 2018; 64:3690-3699. doi: 10.1002/aic.16325.
16. Bottenus D, Veldman T, Caldwell D, et al. Isotope Enrichment of 13C from Methane in Microchannel Distillation Devices at Cryogenic Temperatures.
17. TeGrotenhuis W, Bottenus D, Hoppe E, Humble P, Lucke R, Powell M. *Isotope Enrichment Using Microchannel Distillation Technology*. 2018.
18. TeGrotenhuis W E, Powell M R. Packing Structure Capable of Sub-Centimeter HETP for High Purity Distillation of Low Relative Volatility Compounds. American Institute of Chemical Engineers Conference Proceedings; Apr. 3, 2012.
19. TeGrotenhuis W E, Wegeng R S, Whyatt G A, Stenkamp V S, Gaulitz P A, inventors; Microsystem capillary separations. U.S. Pat. No. 6,666,909. 2003.
20. Tegrotenhuis W E, Stenkamp V S, inventors; Battelle Memorial Institute, USA. assignee. Conditions for fluid separations in microchannels, capillary-driven fluid separations, and laminated devices capable of separating fluids. US20020144600A1.
21. TeGrotenhuis W E, Stenkamp V S, inventors; Methods for fluid separations, and devices capable of separating fluids. U.S. Pat. No. 7,051,540. 2006.
22. Tegrotenhuis W E, Wegeng R S, Whyatt G A, Stenkamp V S, Gauglitz P A, inventors; Battelle Memorial Institute, USA. assignee. Microchannel-based capillary-flow microsystem with wicks and channels for gas-liquid separations. WO2001093976A2.

23. TeGrotenhuis W E, Stenkamp V S, inventors; Improved conditions for fluid separations in microchannels, capillary-driven fluid separations, and laminated devices capable of separating fluid. U.S. Pat. No. 6,875,247.

24. Stenkamp V S, TeGrotenhuis W E, Wegeng R S, inventors; Pacific Northwest National Lab. (PNNL), Richland, W A (United States), assignee. Mixing in wicking structures and the use of enhanced mixing within wicks in microchannel devices. U.S. Pat. No. 7,540,475; U.S. patent application Ser. No. 11/229,349.

25. Huang X W, King D A, Zheng F, et al. Hydrodesulfurization of JP-8 fuel and its microchannel distillate using steam reformate. *Catal Today*. Jul. 31, 2008; 136(3-4): 291-300. doi: 10.1016/J.CATTOD.2008.01.011.

26. Sundberg A, Uusi-Kyyny P, Alopaeus V. Novel micro-distillation column for process development. *Chem Eng Res Des*. May 2009; 87(5a):705-710. doi: 10.1016/j.cherd.2008.09.011.

27. Hickey T. *Advanced Distillation Final Report*. 2009. http://www.osti.gov/scitech/servlets/purl/1000368

28. Yamanishi T, Kinoshita M. Preliminary Experimental-Study for Cryogenic Distillation Column with Small Inner Diameter, 2. *J Nucl Sci Technol*. 1984; 21(11):853-861.

What is claimed:

1. A distillation apparatus comprising a column having mutually perpendicular dimensions of length, width and thickness, the column comprising:

a plurality of adjacent or intersecting flow channels comprising channel walls comprising a first material comprising bonded particles;

wherein the first material forms continuous wicking channels along the length of the column;

wherein the wicking channels have contiguous porosity along the length of the column formed from interstices between the bonded particles;

a plurality of open vapor channels bounded by the channel walls and having an open diameter of at least 50 μm along the length of the column and wherein the open vapor channels are not straight such that a straight line cannot be drawn along a 5 cm length of the column through an open vapor channel in the plurality of open vapor channels;

wherein the column has a length of at least 5 cm; and an impermeable outer jacket surrounding the flow channels, including the first material and open vapor channels, in the length direction and wherein the channel walls are hexagonal and wherein the column has a porous honeycomb internal structure.

2. The distillation apparatus of claim 1 wherein the channel walls are formed from metal particles in an additive manufacturing process.

3. The distillation apparatus of claim 2 wherein the outer jacket is formed from metal particles in an additive manufacturing process.

4. The distillation apparatus of claim 1 wherein the flow channels comprising channel walls comprising a first material comprising bonded particles are undulating or helical.

5. The distillation apparatus of claim 4 wherein the flow channels are adjacent and not intersecting.

6. The distillation apparatus of claim 1, wherein the channel walls have a gradient of porosity wherein a region adjacent the open vapor channel has a higher porosity as compared to a region in the interior of the channel wall; wherein porosity is defined as pore volume per cubic centimeter (cc); wherein the region adjacent to the open vapor channel is selected to be on one side of the channel wall and is selected to be 20% of the cross-sectional area of a cross-section of a channel wall and the interior region is selected to be the central 40% of the channel wall, and wherein the ratio of (porosity of region adjacent the open vapor channel/porosity of interior region) is at least 1.2, or at least 1.5, or at least 2.0, or in the range of 1.2 to 3.

7. The distillation apparatus of claim 6 wherein the bonded particles are nickel-based.

8. The distillation apparatus of claim 1 wherein the column comprises a first end and a second end at opposite sides of the length of the column;

wherein the first end comprises a liquid inlet and a vapor outlet; and wherein the second end comprises a liquid outlet and a vapor inlet.

9. The distillation apparatus of claim 8 wherein the liquid inlet is disposed between the column and a condenser.

10. The distillation apparatus of claim 9 further comprising a recuperator connected to an air inlet and an air outlet.

11. The distillation apparatus of claim 8 comprising a vacuum can wherein the column, liquid inlet, vapor outlet, liquid outlet, and vapor inlet are disposed within the vacuum can.

12. The distillation apparatus of claim 11 wherein the pressure inside the vacuum can is 0.1 atm or less.

13. The distillation apparatus of claim 1 wherein the flow channels comprise a first portion having a length that is perpendicular to the force of gravity and a second portion having a length that is parallel to the force of gravity; wherein length is defined by the direction of net flow of a fluid, over a length of at least one cm, during operation.

14. The distillation apparatus of claim 1, wherein the open vapor channels are curved.

15. A distillation apparatus comprising a column having mutually perpendicular dimensions of length, width and thickness, the column comprising:

a plurality of adjacent or intersecting flow channels comprising channel walls comprising a first material comprising bonded particles;

wherein the first material forms continuous wicking channels along the length of the column;

wherein the wicking channels have contiguous porosity along the length of the column formed from interstices between the bonded particles;

a plurality of open vapor channels bounded by the channel walls and having an open diameter of at least 50 μm along the length of the column and wherein the open vapor channels are not straight such that a straight line cannot be drawn along a 5 cm length of the column through an open vapor channel in the plurality of open vapor channels;

wherein the column has a length of at least 5 cm; and an impermeable outer jacket surrounding the flow channels, including the first material and open vapor channels, in the length direction;

wherein the open vapor channels are 90 to 100% open and have an open flow path from an inlet to an outlet of the column with no intervening filters or other materials.

* * * * *